(No Model.) 7 Sheets—Sheet 1.

W. A. CROWDUS.
AUTOMOBILE VEHICLE.

No. 598,314. Patented Feb. 1, 1898.

Witnesses:
Inventor:
Walter A. Crowdus,
By Banning & Banning & Sheridan,
Attys

(No Model.) 7 Sheets—Sheet 4.

W. A. CROWDUS.
AUTOMOBILE VEHICLE.

No. 598,314. Patented Feb. 1, 1898.

Witnesses:
Inventor:
Walter A. Crowdus

(No Model.) 7 Sheets—Sheet 6.

W. A. CROWDUS.
AUTOMOBILE VEHICLE.

No. 598,314. Patented Feb. 1, 1898.

Witnesses:
Chas. E. Gaylord,
Lute L. Filter.

Inventor:
Walter A. Crowdus,
By Banning & Banning & Sheridan,
Attys.

(No Model.) 7 Sheets—Sheet 7.

W. A. CROWDUS.
AUTOMOBILE VEHICLE.

No. 598,314. Patented Feb. 1, 1898.

Fig. 17.

Witnesses:
Chas. E. Gaylord,
Lute J. Alter

Inventor:
Walter A. Crowdus,
By Banning & Banning & Sheridan,
Attys.

THE NORRIS PETERS CO., PHOTO-LITHO., WASHINGTON, D. C.

UNITED STATES PATENT OFFICE.

WALTER A. CROWDUS, OF CHICAGO, ILLINOIS.

AUTOMOBILE VEHICLE.

SPECIFICATION forming part of Letters Patent No. 598,314, dated February 1, 1898.

Application filed October 9, 1896. Serial No. 608,362. (No model.)

*To all whom it may concern:*

Be it known that I, WALTER A. CROWDUS, a citizen of the United States, residing at Chicago, in the county of Cook and State of Illinois, have invented certain new and useful Improvements in Automobile Vehicles, of which the following is a specification.

My invention relates particularly to that class of vehicles that are adapted to be self-propelled on the common wagon-roads and which are generally known as "motocycles," and especially to the means for operating such vehicles.

The principal object of my invention is to provide a simple, economical, and efficient automobile vehicle with an electric motor.

A further object of my invention is to provide an electrically-propelled vehicle with an automatic clutch for picking up the load after the motor is energized.

A further object of my invention is to provide an automobile vehicle with an electric motor and means for varying the resistance of the motor simultaneous with the changing of the electromotive force of the electric energizer.

Further objects of my invention will be apparent from the following description, claims, and examination of the drawings.

The invention consists principally in an organized vehicle in which there is combined an electrically-actuated motor normally disengaged from the driven wheel or wheels and provided with a friction-clutch arranged to be automatically engaged with the driven wheel or wheels after the motor has been energized by electric current.

The invention consists, further, in an organized electrically-propelled vehicle having combined therein two sets of electric batteries, a single shunt-wound electric motor arranged to be connected with the driving wheel or wheels, and means for varying the resistance of the motor simultaneous, or nearly so, with the changing of the electromotive force of the batteries.

The invention consists, further, in an organized motovehicle having combined therein two sets of batteries, a speed-regulating switch, a shunt-wound electric motor, and a pole-changing switch connected with the batteries and arranged to be actuated by the movement of the motor-switch to vary the electromotive force of the batteries and the speed of the motor.

The invention consists, further, in combining with an automobile vehicle a steering-handle arranged to guide the vehicle by its lateral movements and control the speed by a rotary movement.

The invention consists, further and finally, in the features, combinations, and details of construction hereinafter described and claimed.

In the accompanying drawings.

In constructing a vehicle in accordance with my improvements I make a frame portion A of the desired size, shape, and strength by taking pieces of metal tubing and bending them so as to make a set of double side-bars *a*, which are located each side of the platform A' of the wagon, and secure them together by tie-rods or tubes A⁴. To the rear portion of the frame I secure an axle A², which has the main driving and supporting wheels B independently and rotatably mounted thereon.

Figures 8, 9, 10, 11:
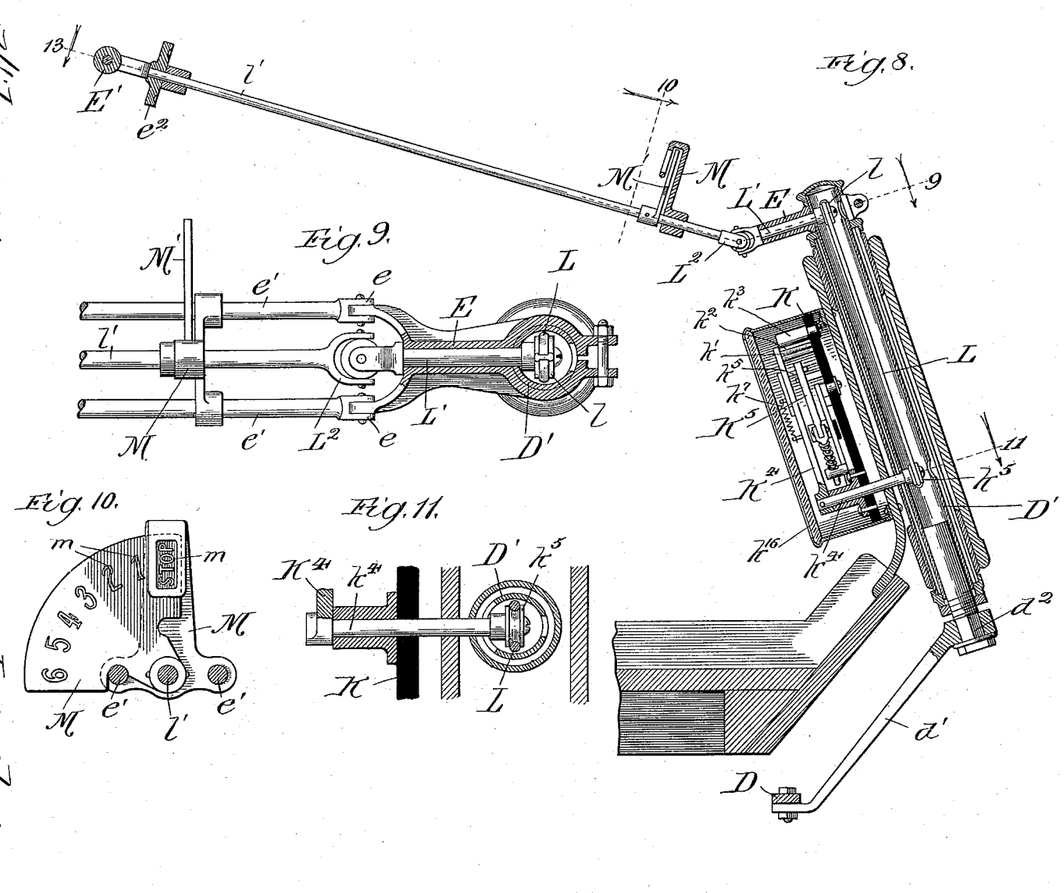
Fig. 8, an enlarged sectional elevation of a portion of the steering mechanism, taken on the line 8 of Fig. 3.
Fig. 9, an enlarged sectional plan view of a portion of the steering and regulating mechanism, taken on the line 9 of Fig. 8.
Fig. 10, an enlarged sectional view of a portion of the speed-indicating mechanism, taken on the line 10 of Fig. 8.
Fig. 11, an enlarged transverse view taken on the line 11 of Fig. 8.

In order to support the front portion of the frame and guide the vehicle, I provide two fork portions C, which are independently pivoted at $c$ in the front portion of the frame, thus doing away with the necessity of the usual fifth-wheel and rendering the steering easier. In order to operate these forks so as to guide or turn the vehicle, I provide a cross-bar D and pivotally connect it with the forks by means of angle-pieces $d$, which extend inwardly and downwardly from the fork at an angle of about thirty degrees. This movable cross-bar is connected with a vertical tubular steering-post D' by means of a connecting-rod $d'$, which is rigidly secured to the steering-post by means of a bolt $d^2$ and pivotally secured to the movable cross-bar D. This steering-post is pivotally mounted in the frame portion, as shown in Fig. 8, and its upper end is provided with a handle portion E. For convenience this handle portion is made in two portions pivoted together, so as to form a knuckle-joint at $e$, (see Fig. 1,) so that the handle may be swung up or down to facilitate the getting in or out of the vehicle, as well as to relieve the person guiding the vehicle from any shock or jar incident to the movement of the vehicle.

In order to propel the vehicle, I provide a single motor F of the shunt-wound type. This motor is preferably bolted to or rigidly supported upon a suitable drop-frame $f$, so that its armature-shaft $f'$ may be brought below a line of the body-bed. The main driven wheels are provided on their inner sides with internal annular gears G, which in turn engage with driving-pinions $g$, that are rotatably mounted in bearings rigidly secured to the vehicle-frame in line with the armature-shaft, of which they practically form independent extensions.

The "driving-wheels," as I prefer to term them, are provided with pneumatic tires $b$, so that it is impracticable to use a brake in connection therewith. In order to provide a brake, however, I prefer to use the outer smooth surface or periphery of the internal annular gears for the braking-surface. I next provide a brake-shoe $b'$ and pivot it in a suitable frame B' on the side-bars. This shoe is operated by means of a foot-lever B², with which it is connected by means of a rod $b^3$ and lever-arm $b^4$.

Figures 4, 5, 6, 7:
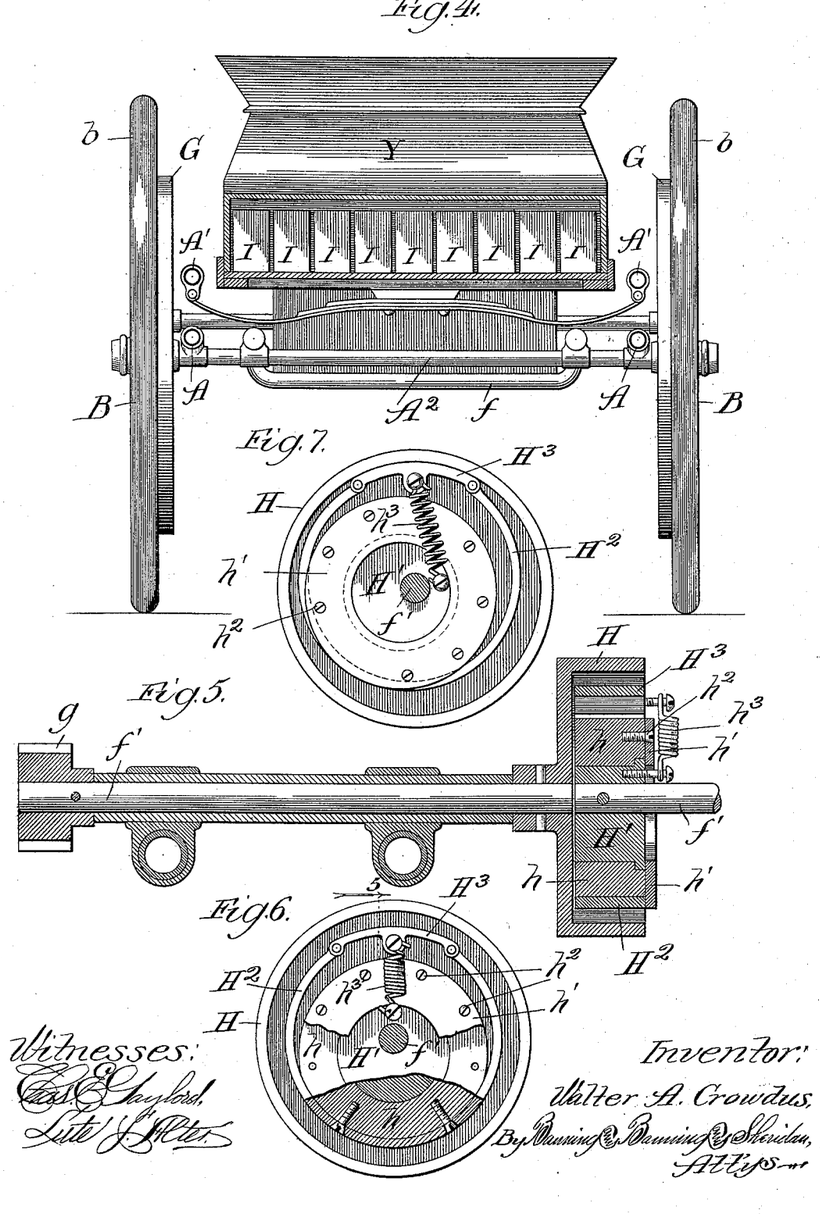
Fig. 4, a rear end elevation of the vehicle, showing a portion in section and taken on line 4 of Fig. 2.
Fig. 5, an enlarged sectional view taken through a portion of the armature and driving shafts on line 5 of Figs. 3 and 6.
Figs. 6 and 7, enlarged views of the automatic clutch mechanism.

It is well known that in starting an electric motor from rest the armature has practically little power until a speed sufficient to generate a counter electromotive force has been attained, and for this reason an electromotor requires many times more its normal amount of current in order to start a load from rest. To overcome this serious objection, I have made an armature-shaft, as above indicated, in several parts, one that contains and supports the armature and two undependent extensions that carry the driving-pinions. These several shafts are adapted to be connected together by means of an automatically-actuated centrifugal friction-clutch, as hereinafter fully described, and which is designed so as not to be actuated until the armature of the motor has attained a given speed or a predetermined number of revolutions per minute. To accomplish this result and construct a clutch, I provide a circular friction-cup H, which is rigidly secured, as shown in Fig. 5, to the pinion-shaft, with its cup-shaped portion extending toward the armature. To the outer end of the armature-shaft I rigidly secure an eccentric block or disk H' and on it mount a ring, which I term, for convenience, a "circular strap" portion $h$, which is held thereon firmly and rotatable by means of the flange-disk $h'$, which is secured thereto by screws $h^2$ or in any other desired manner. To this ring or strap portion I rigidly secure a split circular spring H², which is provided with a shoe portion H³, adapted to engage with the inner surface of the friction-cup. This shoe portion is connected with the eccentric portion by means of a helically-coiled spring $h^3$, of any desired tension, which acts to hold the shoe and friction-cup in normal disengagement, as shown in Fig. 6. When the motor is supplied with current and its shaft rotated, the shoe and eccentric begin to lag behind on account of the tangential pull until sufficient speed is reached to overcome the tension of the helical spring, which action forces the shoe into engagement with the inner surface of the friction-cup, as shown in Fig. 7. The moment the shoe comes into frictional engagement with the inner surface of the cup the lagging pull is increased by the amount of friction between the surfaces of the shoe and cup, which causes further lagging on the part of the shoe and acts to exert force on the circular spring, thus giving the shoe additional contact-pressure against the cup in proportion to the pull exerted by the motor. The advantage of this peculiar centrifugal clutch will be better appreciated when it is known that in turning a corner one of the wheels must necessarily travel at a higher relative speed than the other. The moment the outer wheel takes the curve the shell or friction-cup is rotated faster than the armature-shaft and, as a consequence, pulls the shoe forward until it becomes disengaged. A further advantage is that the clutch may be used to operate the vehicle forward or backward and at the same time permit differential rotation of the driving-wheels, as above noted.

Figure 1:
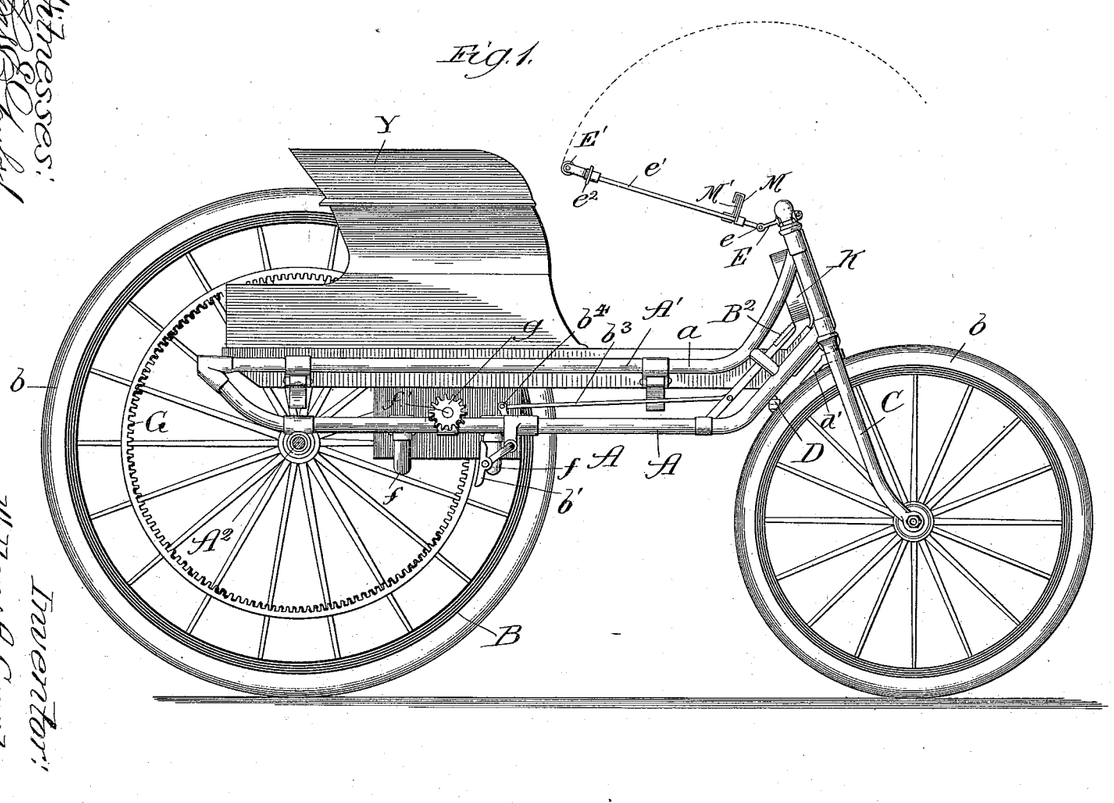
Figure 1 is a side elevation of a vehicle constructed in accordance with my improvements with one of the large driving-wheels removed.
Figures 1, 2:
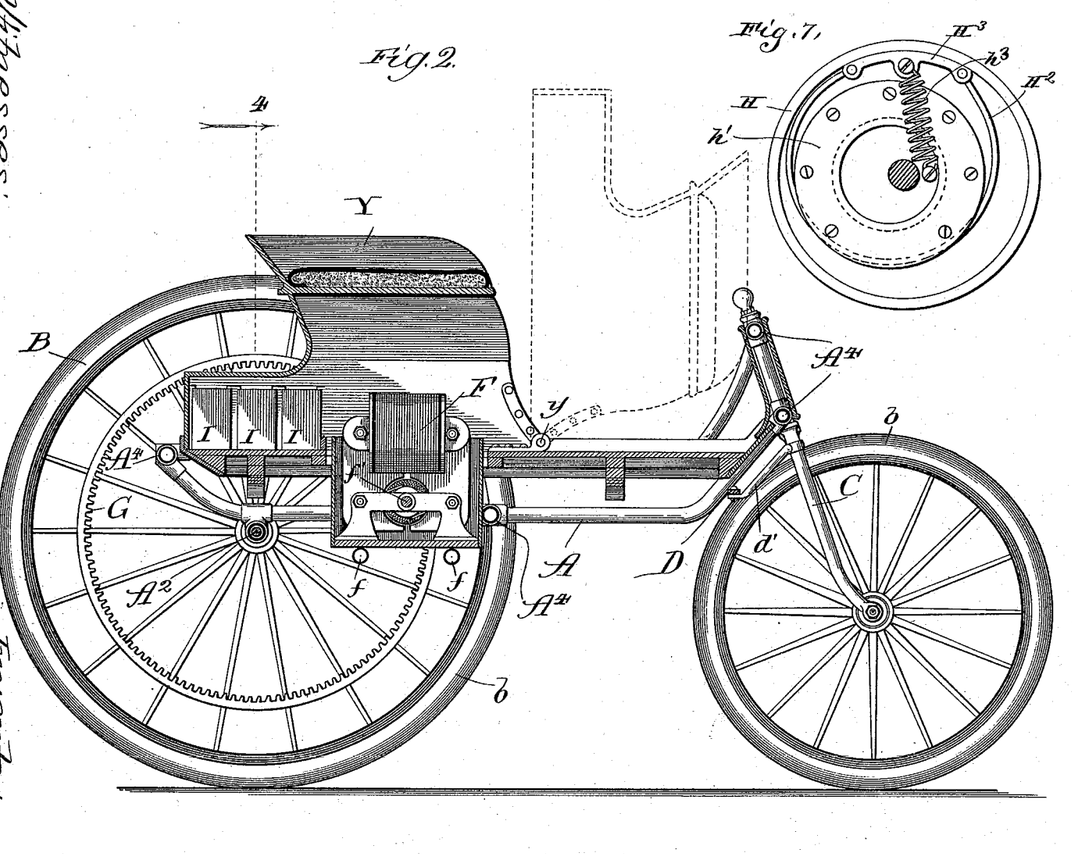
Fig. 2, a sectional elevation of a vehicle fitted with my improvements, taken on the line 2 of Fig. 3.
Figure 3:
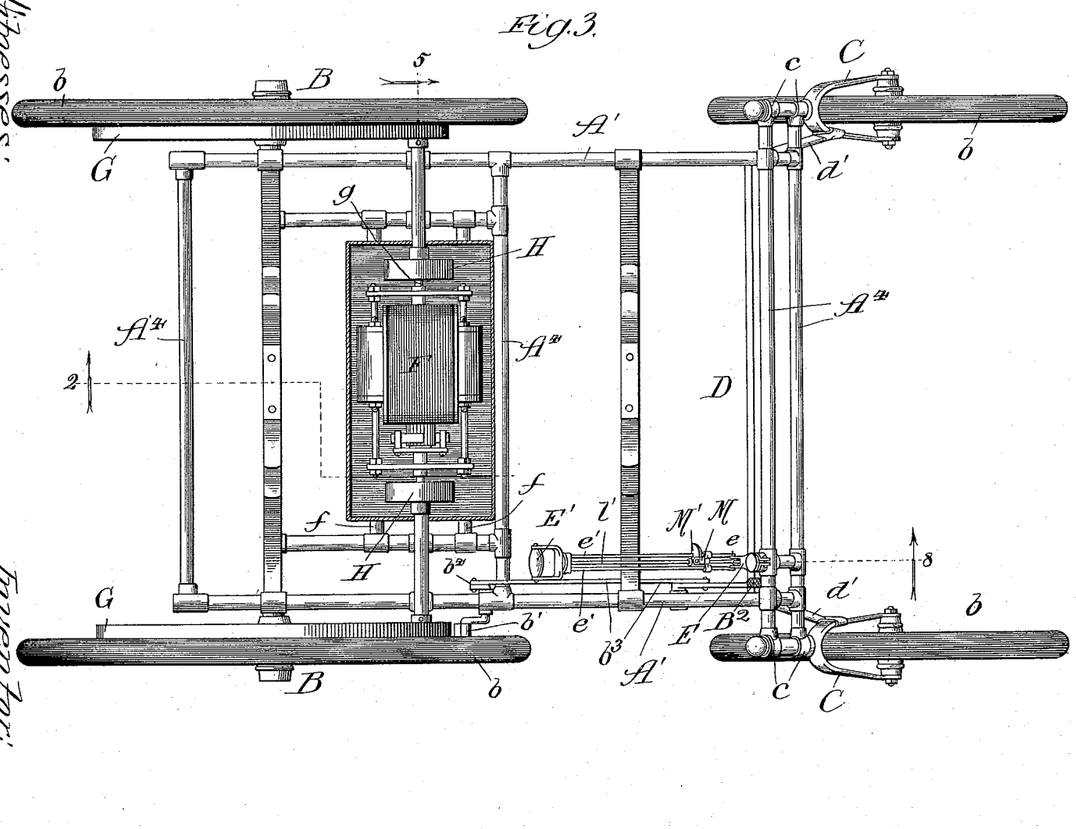
Fig. 3, a plan view of the vehicle, looking at it from the top, with the body and other portions removed.
Figure 17:
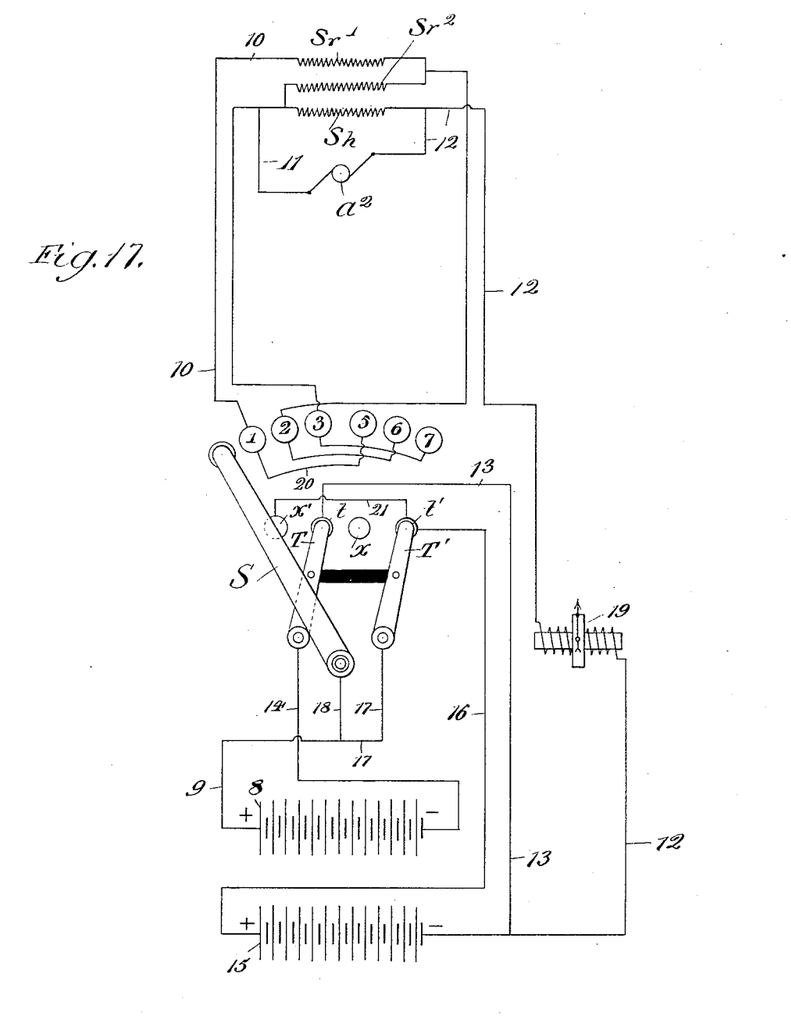
Fig. 17, a diagrammatic view showing the electric circuit.

To furnish current for the motor, I prefer to use two sets of storage batteries, (indicated by the index-numerals 1 in Figs. 2 and 4 and index-numerals 8 and 15 in the diagrammatic view.) These batteries are electrically connected with the different poles of the motor, and between them and the motor is interposed a regulating-switch K, that is arranged to throw them into series or parallel relation with one another, as desired, so that at the start a low electromotive force and a large current is available to produce large torque and slow speed of the motor, while at the same time it permits, when desired, a higher speed from the higher electromotive force.

Figure 12:
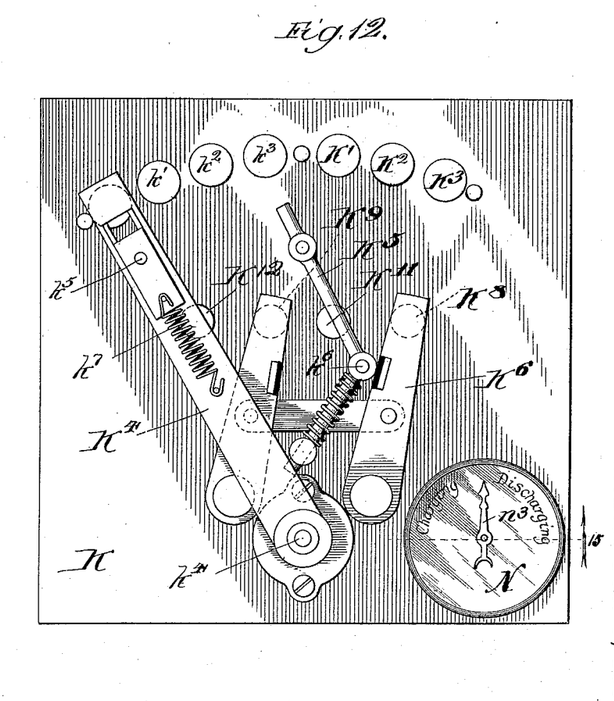
Fig. 12, an enlarged front elevation of the switch.

In Fig. 12 I have shown the switch enlarged and as containing two sets of switch-buttons and two sets of switch-levers, one representing the terminals of the field-windings of the motors and the other the circuits of the batteries. The buttons $k'$, $k^2$, and $k^3$ are electrically and respectively connected with the switch-buttons K', K², and K³, so as to be in exact duplicate with each other and represent the terminals of the field-windings. The main switch-lever K⁴ is pivoted to the switchboard $k^4$ and passes through the same into the tubular steering-post, the inner end of which is provided with a pulley $k^5$. This pulley is connected by means of a flexible-wire cable L with a pulley $l$ on the inner end of a shaft L', that is connected with the handle-shaft $l'$ of the steering-handle by means of a knuckle-joint L². By this arrangement when the vehicle is steered by a lateral movement of the handle portion no consequent action takes place in the electric switch. The moment, however, the steering-handle shaft is rotated the flexible-wire cable is moved and the main switch-lever vibrated. When it is desired to operate the vehicle at a slow speed, the main lever K⁴ is brought into contact with one of the first three switch-buttons of the field-terminals. When it is desired to develop the full power of the motor, the main switch-lever K⁴ is moved successively onto the second set of switch-buttons of the field-terminals. As it passes the center of the two sets of buttons a pin $k^5$ contacts the upper free end of a compound pivoted lever K⁵ and throws it the opposite way in such manner that its jointed or angle part $k^6$ is moved from contact with one of the pole-changing switch-levers K⁶ and is forced by the action of the coiled spring $k^7$ against the opposite pole-changing switch-lever, throwing such switch-levers from contact with the switch-buttons K⁸ and $k^9$ into contact with the switch-buttons K¹¹ and K¹². This action connects the two sets of batteries in series relation to each other, as will be more fully hereinafter explained when describing the diagrammatic view Fig. 17.

It will be noticed that when the main switch-lever is on the first set of three buttons the motor is operated with one-half of the electromotive force that it will receive when the switch-lever is on the last or second set of three buttons and that by this means I am enabled with only two series winding on the motor-field to obtain six variations of speed. This is accomplished by a sudden interruption of the battery-circuit simultaneous or nearly so with the passing of the main switch-lever from the first to the second set of buttons.

It is desirable that the operator of the vehicle should know on which switch-button the switch-lever is resting, which of course determines the speed of the vehicle. To accomplish this result, I provide a cap portion M, which is rigidly secured to the two side bars $e'$ of the steering-handle. To the center rotating handle-shaft I secure a segmental disk M', having thereon certain characters or marks $m$ to denote numerals or letters, as indicated in Fig. 10. These can be shown in words, figures, or any desired marks whatever to indicate certain speeds. The handle portion E' at its inner end is provided with a circular disk $e^2$, having the same number of indentations as the speed-indicator has characters, so that a movable pin $e^3$ in one of the side bars may engage the same and thus inform the operator when the handle is in correct position.

Figure 13:
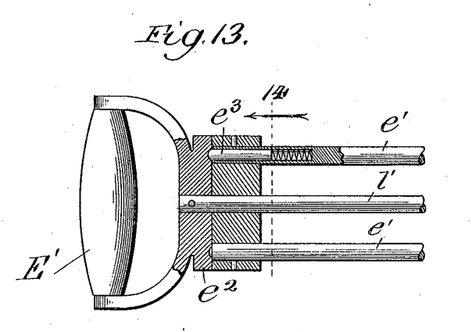
Fig. 13, an enlarged view of the steering-handle.
Figures 14, 15:
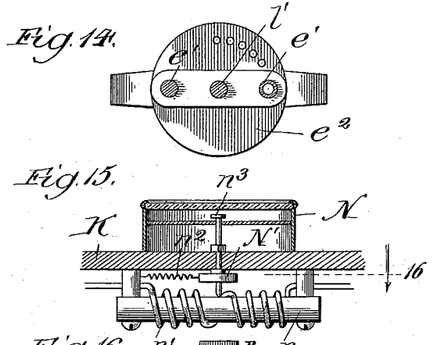
Fig. 14, a cross-sectional view taken on the line 14 of Fig. 13.
Fig. 15, a sectional view of the current-indicator, taken on the line 15 of Fig. 12.

The switch, as will be seen by Figs. 1 and 18, is located on the inner side of the dashboard and is provided with a glass front $k^{16}$, thus rendering visible to the operator the location of the switch-points. The switchboard is further provided with a current-indicator to show when the batteries—especially if storage batteries are used—are charging or being discharged.

Figure 16:
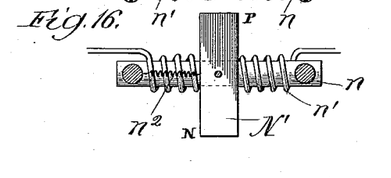
Fig. 16, a sectional view of the current-indicator mechanism, taken on the line 16 of Fig. 15.

As it is well known in the art that a shunt-wound motor, as described hereinafter, may become a dynamo or generator of electricity, if the speed of the vehicle should accelerate the motor to a greater speed than it is driven by its batteries. To take advantage of this acceleration of speed of the motor to determine whether to hold the circuit open or closed during the descending of a grade, the current-indicator is provided and preferably secured to the switchboard. This indicator is constructed as follows, (see Figs. 16 and 17:) A piece of soft iron $n$ is provided with a coil of large wire $n'$, which is connected in series with the motor-circuit, thus forming an electromagnet. A polarized armature is provided and pivotally mounted over the center of the magnet and held at right angles thereto by means of a small coiled spring $n^2$. When the current is turned into the motor, the armature is vibrated so that its indicating-hand $n^3$ will point toward the word "Discharging." (Shown in Fig. 12.) If from any cause current flows from the motor to the batteries, which is in a reverse direction from the manner above described, the polarized armature will be vibrated in an opposite direction and its indicating-hand point to the word "Charging." The operator can thus in descending a grade keep the circuit closed for a while to determine whether the speed of the vehicle is high enough to charge the batteries, and if so he keeps the circuit closed.

If not, he can turn the handle in such a manner as to open the battery-circuit and thus save power.

Describing now the electric circuits shown in diagrammatic view in Fig. 17, the parts are shown so that the circuit is open and the motor at rest. When the main switch-lever S is moved so as to contact the field-terminals 1, 2, or 3, the batteries are connected in parallel. When the main switch-lever is moved so as to contact the field-terminals 5, 6, and 7, the pole-changing switch-levers T T' are moved over from buttons $t\ t'$ to contact-buttons $x\ x'$. This throws the batteries in series relation with each other. When the main switch-lever is moved so as to contact field-terminals 1, current starts from battery 8, flows through wire 9, through switch-lever S to button $t$, through wire 10 to outer series coil $Sr'$, through inner series coil $Sr^2$, where it divides and flows through the shunt-coil $Sh$, and by wire 11 through armature $Ar$, back by wires 12 13, switch-point $t$, switch-lever T, and wire 14 to negative pole of the battery 8. At the same time current flows from battery 15 through wire 16 to switch-point $t'$, switch-lever T', wires 17 and 18 to main switch-lever S, thence through wire 10 to outer series coil, and to inner series coil, where it divides and flows through the shunt-coil and armature, and thence back by wire 12 to negative pole of battery 15. On wire 12 I have shown the current-indicator 19, which indicates the direction of the flow of current. By moving the main switch-lever to button 2 the outer series coil of the field is cut out of circuit. By moving the switch-lever to button 3 both of the series coils are cut out of circuit. It is intended when the switch-lever is bridging the space between the terminals 3 and 5 that the pole-changing switch-levers are moved simultaneously or nearly so, so as to have their outer free ends move to contact the switch-buttons X and X'. When the main switch-lever is on button 5, current flows from battery 8, through wires 9 and 18, main switch-lever S to button 5, thence by wire 20 to button 1, thence by wire 10, through the outer and inner series coils, where it divides and flows through the shunt-coil and armature, thence back by wire 12 to negative pole of battery 15, thence by wire 16 to button $t'$, thence by wire 21 to button X' through switch-lever T, and back by wire 14 to negative pole of battery 8. It will thus be seen that by the movement of the switches the batteries can be thrown into parallel or series relation with each other. By moving the main lever S to the successive buttons 6 and 7 the field-windings are cut out; otherwise the circuit is the same.

In Fig. 2 of the drawings I have shown the seat portion and case Y as hinged to the body at $y$, so that the batteries are covered when the vehicle is in use. When it is desired to gain access to either of the batteries or the motor, all that is necessary to do is to swing the seat portion forward to that position (shown in dotted outline) which leaves the parts open, as if on a platform, and permits an easy inspection of buttons and motor.

While I have described my invention with more or less minuteness as regards details and as being embodied in more or less precise forms, I do not desire to be limited strictly thereto any more than is pointed out in the claims. On the contrary, I contemplate all proper changes in form, construction, and arrangement, the omission of immaterial parts and substitution of equivalents, as circumstances may suggest or render expedient.

I claim—

1. In automobile mechanism, the combination of a motor, a driven wheel or wheels mounted upon a shaft or shafts, and friction-clutch mechanism adapted to be automatically actuated by centrifugal force to set the frictional clutch mechanism and engage the motor-shaft with the driven wheel or wheels, substantially as described.

2. In vehicles of the class described, the combination of an electrically-actuated motor provided with an armature-shaft, a driven wheel or wheels mounted upon a shaft or shafts and normally disengaged from the motor, and a friction-clutch arranged to be automatically actuated by centrifugal force to engage the driven wheel or wheels with the armature-shaft after the motor has been energized by electric current, substantially as described.

3. In vehicles of the class described, the combination of an electrically-actuated motor provided with an armature and shaft, a driven wheel or wheels mounted upon a shaft and normally disengaged from the armature-shaft, friction-clutch mechanism adapted to be automatically actuated by centrifugal force to automatically engage the driving wheel or wheels with the armature-shaft after the motor has been energized, substantially as described.

4. In vehicles of the class described, the combination of an electrically-actuated motor provided with an armature and shaft, driven wheel or wheels provided with gear mechanism, independently-mounted shaft or shafts forming practical independent extensions of the armature-shaft and provided with mechanism engaging with the gears of the driving-wheels, and clutch mechanism adapted to be actuated by centrifugal force to automatically engage the armature-shaft with the independently-mounted shaft or shafts after the motor has been energized, substantially as described.

5. In automobile mechanisms, a friction-clutch adapted to be automatically actuated by centrifugal force consisting of an outer friction-shell, an eccentric mounted upon a second shaft, an eccentric-strap loosely mounted upon the eccentric and carrying a split circular spring, a shoe upon the split circular spring adapted to be engaged with the outer friction-shell, and spring mechanism connecting the eccentric with the shoe to regulate the movements of the shoe at different speeds, the parts being so arranged that the shoe and friction-shell will be engaged at certain predetermined speeds, substantially as described.

6. In vehicles of the class described, the combination of a shunt-wound electric motor arranged to be connected with the driving wheel or wheels, two sets of electric batteries, and means for varying the resistance of the motor simultaneously, or nearly so, with the changing of the electromotive force of the batteries, substantially as described.

7. In vehicles of the class described, the combination of a shunt-wound electric motor arranged to be connected with the driving wheel or wheels, two sets of electric batteries, at least two sets of buttons connected with each other and electrically connected with the field-windings of the motor, a main switch for connecting the batteries with the buttons, and a pole-changing switch adapted to automatically shift the batteries from parallel to series relation with each other, or vice versa, simultaneously, or nearly so, with the passing or bridging of the main switch from one set of field-buttons to the other, substantially as described.

8. In vehicles of the class described, the combination of a shunt-wound electric motor, two sets of electric batteries, a speed-regulating switch, a pole-changing switch connected with the batteries and arranged to be actuated by the movements of the speed-regulating switch to vary the electromotive force to the motor, substantially as described.

9. In vehicles of the class described, the combination of a motor arranged to be connected with the driven wheels, and a steering-handle arranged to guide the vehicle by its lateral movements and control the speed of the motor by its rotary movements, substantially as described.

10. In vehicles of the class described, the combination of an electrically-actuated motor, a set or sets of electric batteries connected with the same, a switch for regulating the speed of the motor, and a steering-handle to guide the vehicle by its lateral movements and operate its switch by its rotary movements, substantially as described.

11. In vehicles of the class described, the combination of an electrically-actuated motor, a set of electric batteries connected with the motor, switch and steering mechanism to regulate the speed of the motor by a rotary movement of the mechanism and guide the direction of the vehicle by a lateral movement of said switches and steering mechanism, substantially as described.

12. In vehicles of the class described, the combination of an electrically-actuated motor, a set or sets of electric batteries connected with the motor, a switch arranged on the inner side of the vehicle to be visible to the operator of the vehicle to regulate the speed of the vehicle, and a flexible handle for guiding the vehicle, operating the switch, and adapted to be swung up and down out of the way of the operator and to minimize the shock or jar to the operator's hand, substantially as described.

13. In an automobile vehicle, the combination of a speed-regulating and steering handle having a rotary and a lateral movement, and an indicator arranged to be actuated by the handle to indicate the rate of power or speed admitted to the propelling-motor, substantially as described.

14. In vehicles of the class described, the combination of an electrically-actuated motor, a set or sets of electric batteries connected therewith, a speed-regulating switch arranged on the dashboard of the vehicle, a flexible handle portion arranged on a rotatable shaft and provided with a pulley at its inner end, belt or cable mechanism connecting the pulley of the rotatable handle-shaft with the speed-regulating switch to move the switch by the rotary movements of the handle, substantially as described.

15. In vehicles of the class described, the combination of a wagon-body having a platform carrying electric batteries, and an inclosing seat and case portion pivoted to the body portion and arranged to be swung upwardly to permit inspection of the parts, and when in closed position to protect the batteries and other parts, substantially as described.

WALTER A. CROWDUS.

Witnesses:
THOMAS B. McGREGOR,
THOMAS F. SHERIDAN.